United States Patent
George et al.

(10) Patent No.: US 11,687,265 B2
(45) Date of Patent: Jun. 27, 2023

(54) TRANSFERRING SNAPSHOT COPY TO OBJECT STORE WITH DEDUPLICATION PRESERVATION AND ADDITIONAL COMPRESSION

(71) Applicant: NetApp inc., Sunnyvale, CA (US)

(72) Inventors: Tijin George, Sunnyvale, CA (US); Jagavar Nehra, Bangalore (IN); Roopesh Chuggani, Bengaluru (IN); Dnyaneshwar Nagorao Pawar, Bangalore (IN)

(73) Assignee: NetApp, Inc., San Jose, CA (US)

( * ) Notice: Subject to any disclaimer, the term of this patent is extended or adjusted under 35 U.S.C. 154(b) by 257 days.

(21) Appl. No.: 17/106,268

(22) Filed: Nov. 30, 2020

(65) Prior Publication Data

US 2021/0103397 A1    Apr. 8, 2021

Related U.S. Application Data

(63) Continuation of application No. 16/296,424, filed on Mar. 8, 2019, now Pat. No. 10,852,976.

(51) Int. Cl.
| | |
|---|---|
| *G06F 16/00* | (2019.01) |
| *G06F 3/06* | (2006.01) |
| *G06F 16/11* | (2019.01) |
| *G06F 16/22* | (2019.01) |

(52) U.S. Cl.
CPC ............ *G06F 3/0641* (2013.01); *G06F 3/064* (2013.01); *G06F 3/067* (2013.01); *G06F 3/0608* (2013.01); *G06F 3/0644* (2013.01); *G06F 3/0665* (2013.01); *G06F 16/128* (2019.01); *G06F 16/2246* (2019.01)

(58) Field of Classification Search
CPC ...... G06F 3/0641; G06F 3/0608; G06F 3/064; G06F 3/0644; G06F 3/0665; G06F 3/067; G06F 16/128; G06F 16/2246; G06F 16/1844; G06F 3/065; G06F 3/061
See application file for complete search history.

(56) References Cited

U.S. PATENT DOCUMENTS

| | | | |
|---|---|---|---|
| 8,190,850 B1 * | 5/2012 | Davenport | G06F 16/10 711/170 |
| 9,679,040 B1 | 6/2017 | Davis et al. | |
| 9,811,532 B2 | 11/2017 | Parkison et al. | |
| 9,904,598 B2 | 2/2018 | Kumarasamy | |
| 10,031,917 B2 | 7/2018 | Kumarasamy et al. | |
| 10,037,154 B2 | 7/2018 | Provenzano et al. | |

(Continued)

*Primary Examiner* — Syed H Hasan
(74) *Attorney, Agent, or Firm* — Cooper Legal Group, LLC

(57) ABSTRACT

Techniques are provided for incremental snapshot copy to an object store. A list of deallocated block numbers of primary storage of a computing device are identified. Entries for the list of deallocated block numbers are removed from a mapping metafile. A list of changed block numbers corresponding to changes between a current snapshot of the primary storage and a prior copied snapshot copied from the primary storage to the object store is determined. The mapping metafile is evaluated using the list of changed block numbers to identify a deduplicated set of changed block numbers without entries within the mapping metafile. An object, comprising data of the deduplicated set of changed block numbers, is transmitted to the object store for storage as a new copied snapshot.

20 Claims, 9 Drawing Sheets

(56) References Cited

U.S. PATENT DOCUMENTS

| | | |
|---|---|---|
| 10,089,187 B1 | 10/2018 | Pecoraro et al. |
| 10,127,119 B1 | 11/2018 | Paulzagade et al. |
| 10,162,722 B2 | 12/2018 | Lin et al. |
| 10,176,183 B1 | 1/2019 | Shim et al. |
| 2009/0307449 A1* | 12/2009 | Prahlad ............... G06F 11/1448 711/E12.001 |
| 2010/0333116 A1* | 12/2010 | Prahlad ............... G06F 16/1844 713/153 |
| 2012/0089579 A1 | 4/2012 | Ranade et al. |
| 2012/0089775 A1 | 4/2012 | Ranade et al. |
| 2012/0089781 A1* | 4/2012 | Ranade ................. G06F 16/183 711/E12.001 |
| 2013/0110779 A1 | 5/2013 | Taylor et al. |
| 2014/0344538 A1* | 11/2014 | Pawar .................... G06F 3/061 711/162 |
| 2016/0170823 A1 | 6/2016 | Miller et al. |
| 2016/0210306 A1* | 7/2016 | Kumarasamy ........ G06F 16/178 |
| 2017/0262520 A1 | 9/2017 | Mitkar et al. |
| 2018/0121453 A1 | 5/2018 | Jain et al. |
| 2018/0157559 A1* | 6/2018 | Nallathambi ........... G06F 3/067 |
| 2019/0163580 A1 | 5/2019 | Pandey et al. |
| 2019/0220198 A1* | 7/2019 | Kashi Visvanathan ...................... G06F 3/067 |

\* cited by examiner

TRANSFERRING SNAPSHOT COPY TO OBJECT STORE WITH DEDUPLICATION PRESERVATION AND ADDITIONAL COMPRESSION

RELATED APPLICATION

This application claims priority to and is a continuation of U.S. application Ser. No. 16/296,424, filed on Mar. 8, 2019, now allowed, titled "TRANSFERRING SNAPSHOT COPY TO OBJECT STORE WITH DEDUPLICATION PRESERVATION AND ADDITIONAL COMPRESSION," which is incorporated herein by reference.

BACKGROUND

Many users utilize cloud computing environments to store data, host applications, etc. A client device may connect to a cloud computing environment in order to transmit data from the client device to the cloud computing environment for storage. The client device may also retrieve data from the cloud computing environment. In this way, the cloud computing environment can provide scalable low cost storage.

Some users and businesses may use or deploy their own primary storage systems such as clustered networks of nodes (storage controllers) for storing data, hosting applications, etc. A primary storage system may provide robust data storage and management features, such as data replication, data deduplication, encryption, backup and restore functionality, snapshot creation and management functionality, incremental snapshot creation, etc. However, storage provided by such primary storage systems can be relatively more costly and less scalable compared to cloud computing storage. Thus, cost savings and scalability can be achieved by using a hybrid of primary storage systems and remote cloud computing storage. Unfortunately, the robust functionality provided by primary storage systems is not compatible with cloud computing storage, and thus these features are lost such as compression and deduplication otherwise provided by a primary storage system.

DETAILED DESCRIPTION

Figure 1:
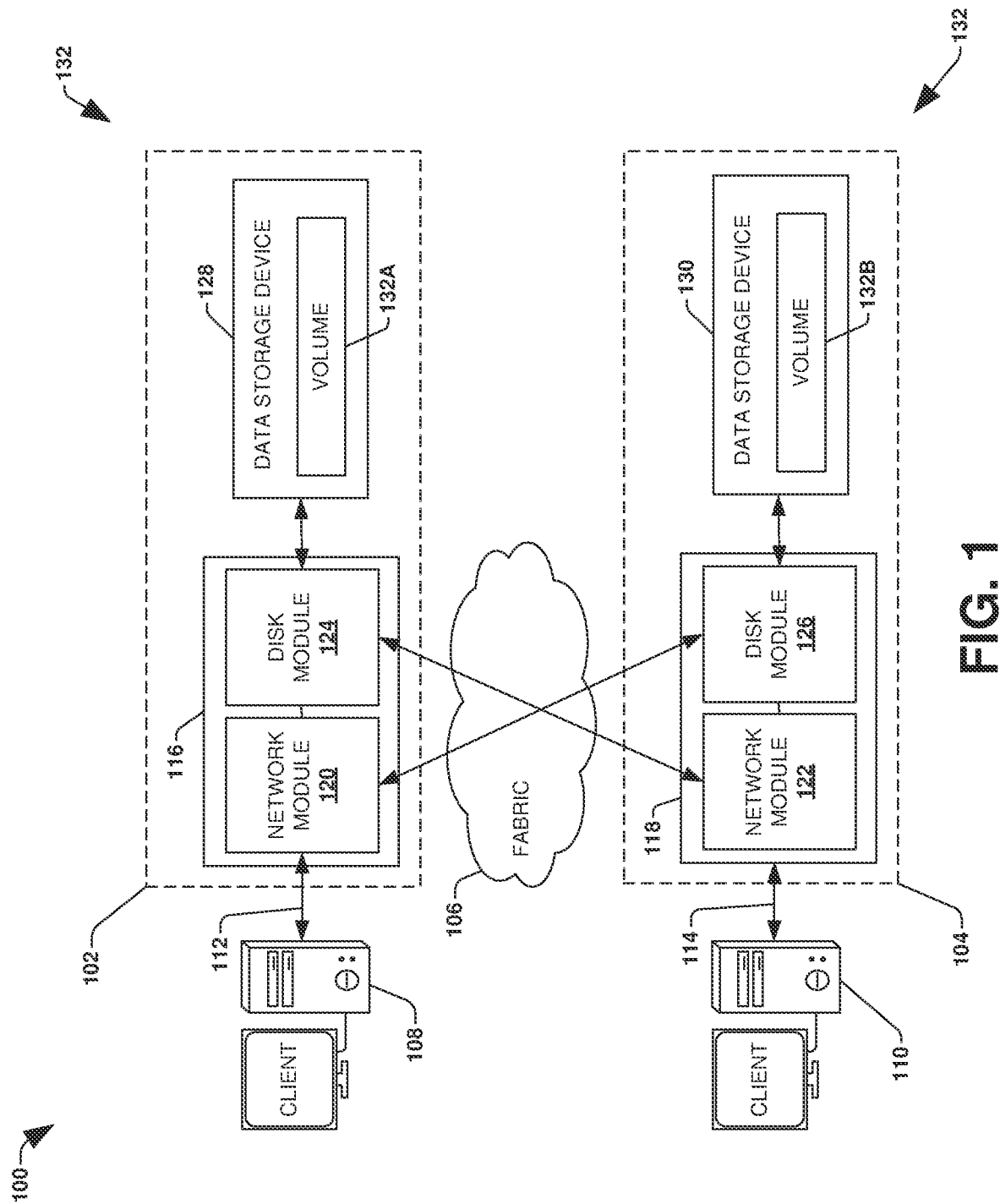
FIG. 1 is a component block diagram illustrating an example clustered network in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

Many users want primary storage system services, such as data replication, data deduplication, compression preservation, encryption, backup and restore functionality, snapshot creation and management functionality, etc. to be compatible with cloud storage provided by a cloud storage environment. In an example, primary data accessed by client devices may be stored within a primary storage system and secondary data (e.g., replicated primary data and copied snapshot data) may be stored in the cloud storage environment in order to reduce an overall total cost of ownership of the secondary data because cloud storage is more cost effective than primary storage. However, many primary storage system services are incompatible with the cloud storage environment, and thus such features are unavailable.

Accordingly, methods and systems are provided herein for copying snapshots from a computing device (e.g., a node, an on-premise device, a storage controller, a computer, or any other hardware or software such as software as a service capable of managing storage of a primary storage system such as a cluster of computing devices) to an object store (e.g., a cloud computing environment) in a manner that preserves deduplication and compression used by the computing device. The present system provides for incrementally copying snapshots of a file system of primary storage of the computing device to the object store as copied snapshots comprised of data stored within objects of the object store. That is, when a current snapshot, maintained by the computing device, is to be copied to the object store, merely unique data blocks of the current snapshot compared to data blocks of already copied snapshots (e.g., data blocks already stored in the object store) are copied while other non-unique blocks are not copied. This incremental copying preserves deduplication and reduces network bandwidth utilization and storage utilization of the object store in order to reduce overall cost of ownership of storing copied snapshots in the object store. The present system can represent each snapshot as a fully logical copy that is fully independent, which enables a simplified representation of snapshot data, and simplifies access and version management of snapshot data. A copied snapshot is fully independent because the copied snapshot can be accessed, in some embodiments, without having to reference or use other copied snapshots (e.g., a single file or any other amount of data can be restored using merely the copied snapshot without having to reference other copied snapshots).

The present system preserves deduplication and compression used by the computing device for snapshots when storing copied snapshots to the object store notwithstanding copied snapshots representing fully logical copies of data in the primary storage of the computing device. In particular, deduplication is preserved because data that is shared in a snapshot (e.g., a local or primary snapshot created and maintain by the computing device) is also shared in a copied snapshot in the object store. Deduplication of compression groups is maintained while logically representing the compression groups in a copied snapshot. Block sharing across multiple snapshots is also preserved so that merely changed blocks are transferred/copied to the object store during incremental snapshot transfers.

The present system provides additional compression on a snapshot data copy. In particular, larger compression groups provide more space efficiency but with less read efficiency compared to smaller compression groups. Relatively smaller compression groups may be used by the computing device of the storage system since access to the primary storage of the computing device may be more read intensive, and thus read efficiency is prioritized over storage space efficiency. Because copied snapshots in the object store are infrequently accessed (e.g., cold data that is infrequently read), relatively larger compression groups can be employed for improved storage space efficiency within the object store, which also reduces network bandwidth for snapshot copying to the object store.

In one embodiment, snapshots maintained by a computing device are copied to an object store, such as a cloud computing environment, as copied snapshots representing logical data of the snapshots. Data of the copied snapshots is stored into slots of objects that are deduplicated with respect to other objects stored within the object store and retain compression used by the computing device for the snapshots.

In an example, the computing device stores data within primary storage. The computing device may create snapshots of the data stored by the computing device. For example, the computing device may create a snapshot of a file, a logical unit number, a directory, a volume, a storage virtual machine hosting a plurality of volumes, a file system, a consistency group of any arbitrary grouping of files, directories, or data, etc. The computing device may deduplicate data between the snapshots so that instead of storing redundant data blocks multiple times, merely references are stored in place of the redundant data blocks and point to original data blocks with the same data. The computing device may compress data within the snapshots, such as by creating compression groups of compressed data blocks.

As provided herein, in order to benefit from the storage cost savings and scalability of the object store, the snapshots are copied to the object store as copied snapshots. In an example, a snapshot of a file system of the computing device is to be copied to the object store. A mapping metafile and/or an overflow mapping metafile are used to facilitate the copying of the snapshots to the object store in a manner that preserves deduplication and compression, logically represents the snapshots as fully independent snapshots, and provides additional compression.

The mapping metafile is populated with entries for block numbers (e.g., virtual volume block numbers, physical volume block numbers, etc. used by the computing device to reference data such as snapshot data stored by the computing device) of snapshots maintained by the computing device and copied into objects of the object store as copied snapshots. An entry within the mapping metafile is populated with a mapping between a block number of data within a snapshot at the computing device (e.g., a virtual volume block number) and a cloud block number (e.g., a cloud physical volume block number) of a slot within an object into which the data was copied when the snapshot was copied to the object store as a copied snapshot. The entry is populated with a compression indicator to indicate whether data of the block number is compressed or not (e.g., a bit set to a first value to indicate a compressed virtual volume block number and set to a second value to indicate a non-compressed virtual volume block number).

The entry is populated with a compression group start indicator to indicate whether the block number is a starting block number for a compression group of a plurality of block numbers of compressed data blocks. The entry is populated with an overflow indicator to indicate whether the data block has an overflow entry within the overflow mapping metafile. The overflow mapping metafile may comprise a V+ tree, such as a special B+ tree with support for variable length key and payload so a key can be sized according to a type of entry being stored for optimization. The key uniquely represents all types of entries associated with a block number (a virtual volume block number). The key may comprise a block number field (e.g., the virtual volume block number of a data block represented by the block number or a starting virtual volume block number of a first data block of a compression group comprising the data block), a physical length of an extent of the data block, if the corresponding entry is a start of a compression group, and other block numbers of blocks within the compression group. The payload is a cloud block number (a cloud physical volume block number). The entry may be populated with a logical length of an extent associated with the block number. The entry may be populated with a physical length of the extent associated with the block number.

The mapping metafile and/or the overflow mapping metafile may be indexed by block numbers of the primary storage (e.g., virtual volume block numbers of snapshots stored by the computing device within the primary storage, which are copied to the object store as copied snapshots). In an example, the block numbers may correspond to virtual volume block numbers of data of the snapshots stored by the computing device within the primary storage. In an example, a block number corresponds to a starting virtual volume block number of an extent of a compression group.

The mapping metafile and/or the overflow mapping metafile is maintained according to a first rule specifying that the mapping metafile and/or the overflow mapping metafile represent a comprehensive set of cloud block numbers corresponding to a latest snapshot copied to the object store. The mapping metafile and/or the overflow mapping metafile is maintained according to a second rule specifying that entries within the mapping metafile and/or the overflow mapping metafile are invalidated based upon any block number in the entries being freed by the computing device.

The mapping metafile and/or the overflow mapping metafile is used to determine what data of the current snapshot is to be copied to the object store and what data already exists within the object store so that only data not already within the object store is transmitted to the object store for storage within an object. Upon determining that the current snapshot is to be copied to the object store, an invalidation phase is performed. In particular, a list of deallocated block numbers of primary storage of the computing device (e.g., virtual volume block numbers, of the file system of which snapshots are created, that are no longer being actively used to store in-use data by the computing device) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

After the invalidation phase, a list of changed block numbers corresponding to changes between the current snapshot of the primary storage being copied to the object store and a prior copied snapshot already copied from the primary storage to the object store is determined. The mapping metafile is evaluated using the list of changed block numbers to identify a deduplicated set of changed block numbers without entries within the mapping metafile. The deduplicated set of changed block numbers correspond to data, of the current snapshot, not yet stored within the object store.

An object is created to store data of the deduplicated set of changed block numbers. The object comprises a plurality of slots, such as 1024 or any other number of slots. The data of the deduplicated set of changed block numbers is stored into the slots of the object. An object header is updated with metadata describing the slots. In an example, the object is created to comprise the data in a compressed state corresponding to compression of the data in the primary storage. The object can be compressed by combining data within contiguous slots of the object into a single compression group. In this way, compression of the current snapshot maintained by the computing device is preserved when the current snapshot is stored in the object store as the object corresponding to a copy of the current snapshot.

The object, comprising the data of the deduplicated set of changed block numbers, is transmitted to the object store for storage as a new copied snapshot that is a copy of the current snapshot maintained by the computing device. The object is stored as a logical copy of the current snapshot. Also, additional compression is applied to this logical data, and information used to uncompress the logical data is stored in the object header. Further, the object is maintained as an independent logical representation of the current snapshot, such that copied data, copied from the current snapshot, is accessible through the object without having to reference other logical copies of other copied snapshots stored in other objects within the object store. Once the object is stored within the object store, the mapping metafile and/or the overflow mapping metafile is updated with entries for the deduplicated set of changed block numbers based upon receiving an acknowledgment of the object being stored by the object store. An entry will map a changed block number to a cloud block number of a slot within which data of the changed block number is stored in the object.

As provided herein, an object file system is provided that is used to store, retrieve, and manage objects within an object store, such as a cloud computing environment. The object file system is capable of representing data in the object store in a structured format. It may be appreciated that any type of data (e.g., a file, a directory, an image, a storage virtual machine, a logical unit number (LUN), application data, backup data, metadata, database data, a virtual machine disk, etc.) residing in any type of computing device (e.g., a computer, a laptop, a wearable device, a tablet, a storage controller, a node, an on-premise server, a virtual machine, another object store or cloud computing environment, a hybrid storage environment, data already stored within the object store, etc.) using any type of file system can be stored into objects for storage within the object store. This allows the data to be represented as a file system so that the data of the objects can be accessed and mounted on-demand by remote computing devices. This also provides a high degree of flexibility in being able to access data from the object store, a cloud service, and/or a network file system for analytics or data access on an on-demand basis. The object file system is able to represent snapshots in the object store, and provides the ability to access snapshot data universally for whomever has access to an object format of the object file system. Snapshots in the object store are self-representing, and the object file system provides access to a complete snapshot copy without having to access other snapshots.

The object file system provides the ability to store any number of snapshots in the object store so that cold data (e.g., infrequently accessed data) can be stored for long periods of time in a cost effective manner, such as in the cloud. The object file system stores data within relatively larger objects to reduce cost. Representation of data in the object store is complete, such that all data and required container properties can be independently recovered from the object store. The object file system format ensures that access is consistent and is not affected by eventual consistent nature of underlying cloud infrastructure.

The object file system provides version neutrality. Changes to on-prem metadata versions provide little impact on the representation of data in the object store. This allow data to be stored from multiple versions of on-prem over time, and the ability to access data in the object store without much version management. The object file system provides an object format that is conducive to garbage collection for freeing objects (e.g., free slots and/or objects storing data of a delete snapshot), such as where a lower granularity of data can be garbage collected such as at a per snapshot deletion level.

In an embodiment, snapshots of data, such as of a primary volume, maintained by a computing device (e.g., a node, storage controller, or other on-prem device that is remote to the object store) can be created by the computing device. The snapshots can be stored in the object store independent of the primary volume and can be retained for any duration of time. Data can be restored from the snapshots without dependency on the primary volume. The snapshot copies in the object store can be used for load distribution, development testing, virus scans, analytics, etc. Because the snapshot copies (e.g., snapshot data stored within objects) are independent of the primary volume at the computing device, such operations can be performed without impacting performance of the computing device.

Figure 4A:
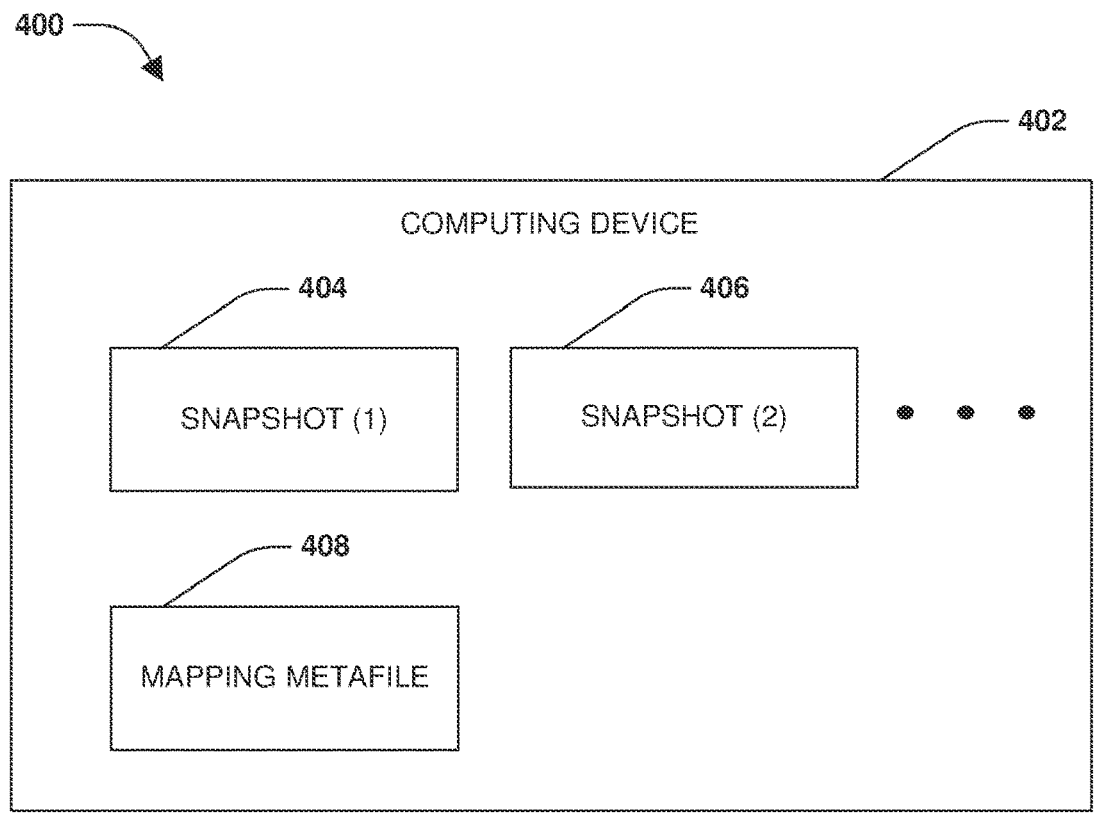
FIG. 4A is a component block diagram illustrating an example system for incremental snapshot copy to object store.
Figure 4A:
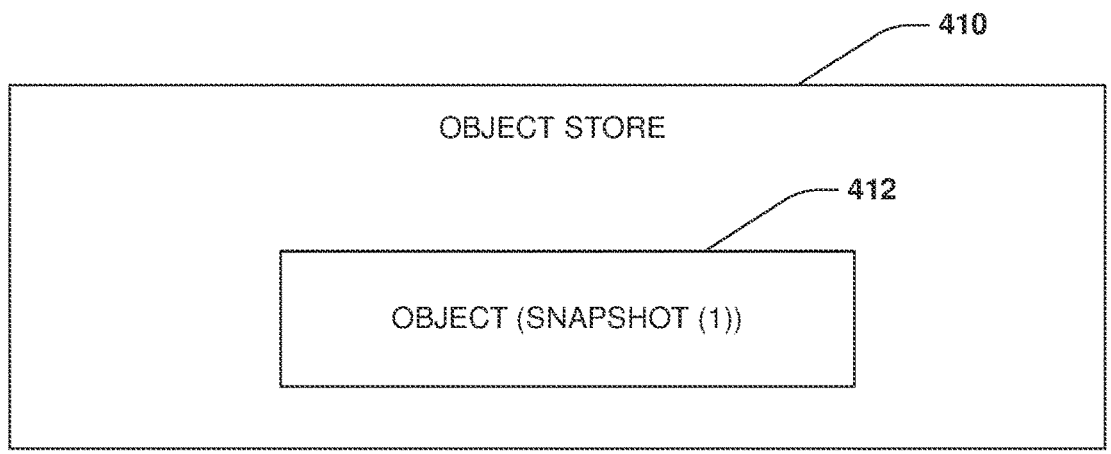
Figure 4B:
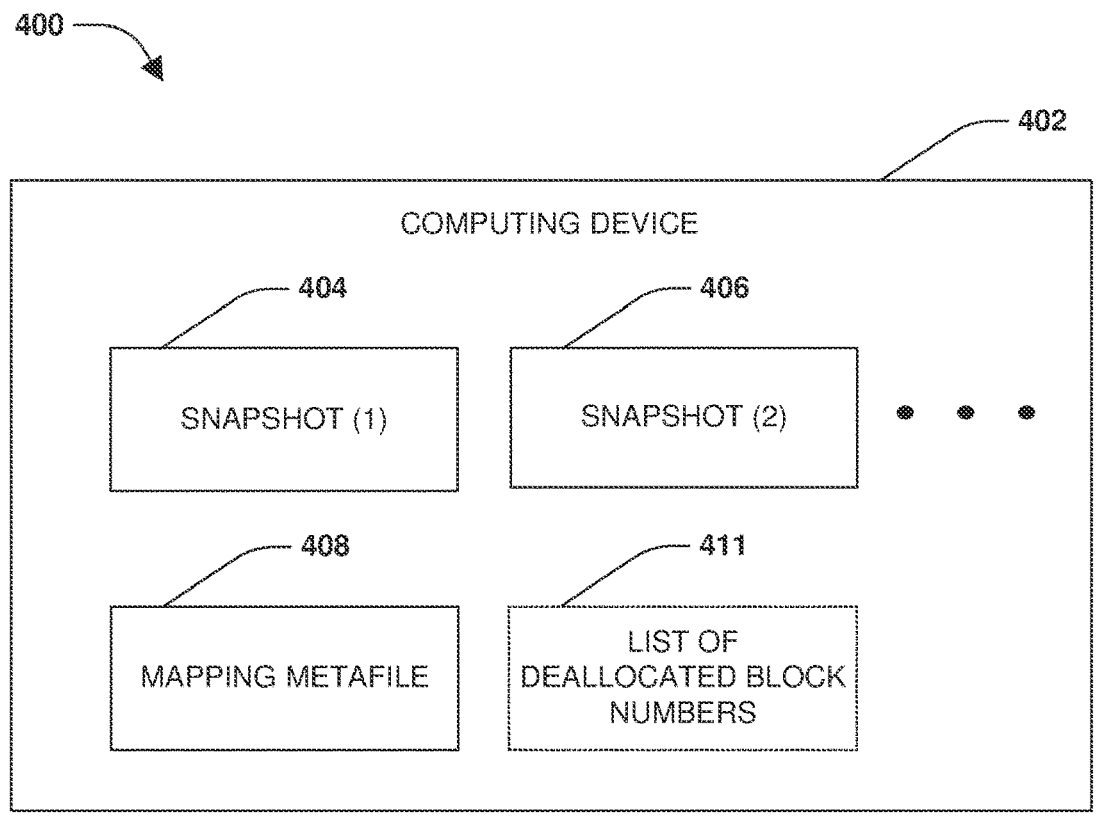
FIG. 4B is a component block diagram illustrating an example system for incremental snapshot copy to object store, where a list of deallocated block numbers is identified.
Figure 4B:
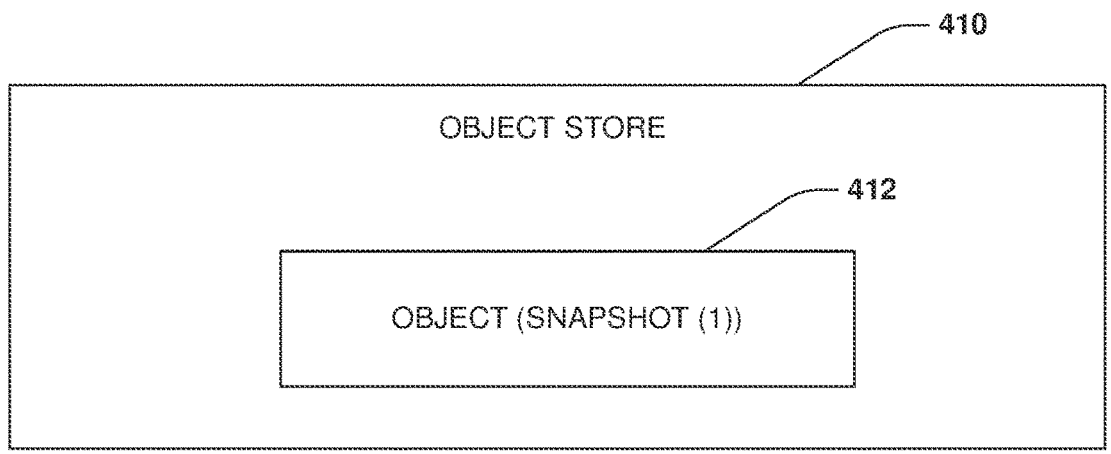

A snapshot is frozen in time representation of a filesystem. All the necessary information may be organized as files. All the blocks of the file system may be stitched together using cloud block numbers (e.g., a cloud block number comprises a sequence number of an object and a slot number of a slot within that object) and the file will be represented by a data structure (e.g., represented in a tree format of a tree structure) when stored into the object store within one or more objects. Using cloud block numbers, a next node within the tree structure can be identified for traversing the tree structure to locate a node representing data to be accessed. The block of the data may be packed into bigger objects to be cloud storage friendly, where blocks are stored into slots of a bigger object that is then stored within the object store. All the indirections (pointers) to reach leaf nodes of a file (e.g., user data such as file data is represented by leaf nodes within the tree structure) may be normalized and may be version independent. Every snapshot may be a completely independent copy and any data for a snapshot can be located by walking the object file system. While doing incremental snapshot copy, changed blocks between two snapshots may be copied to the object store, and unchanged blocks will be shared with previous snapshots as opposed to being redundantly stored in the object store. In this way, deduplication is provided for and between snapshot data stored within objects of the object store. As will be described later, an embodiment of a snapshot file system in the object store is illustrated by FIG. 4B.

Cloud block numbers are used to uniquely represent data (e.g., a block's worth of information from the computing device) in the object store at any point in time. A cloud block number is used to derive an object name (e.g., a sequence number) and an index (a particular slot) within the object. An object format, used by the object file system to format objects, allows for sharing of cloud blocks. This provides for storage space efficiency across snapshots so that deduplication and compression used by the computing device will be preserved. Additional compression is applied before writing objects to the object store and information to decompress the data is kept in the object header.

Similar to data (e.g., a file, directory, or other data stored by the computing device), metadata can be stored into objects. Metadata is normalized so that the restoration of data using the metadata from an object to a remote computing device will be version independent. That is, snapshot data at the computing device can be stored into objects in a version neutral manner. Snapshots can be mounted and traversed independent of one another, and thus data within an object is represented as a file system, such as according to the tree structure. The format of non-leaf nodes of the tree structure (e.g., indirects such as pointers to other non-leaf nodes or to leaf nodes of user data) can change over time. In this way, physical data is converted into a version independent format as part of normalization. Denormalization may be performed while retrieving data from the objects, such as to restore a snapshot. In an example of normalization, a slot header in an object has a flag that can be set to indicate that a slot comprises normalized content. Each slot of the object is independently represented. Slot data may comprise version data. The slot data may specify a number of entries within the object and an entry size so that starting offsets of a next entry can be calculated from the entry size of a current entry.

In an embodiment, denormalization of a first version of data/metadata (e.g., a prior version) can be retrieved from data backed up in an object according to a second version (e.g., a future version). In an example, if the future version added a new field, then during denormalization, the new field is skipped over. Denormalization of a future version can be retrieved from data backed up in an object according to a prior version. A version indicator in the slot data can be used to determine how of an entry is to be read and interpreted, and any missing fields will be set to default values.

Figure 4C:
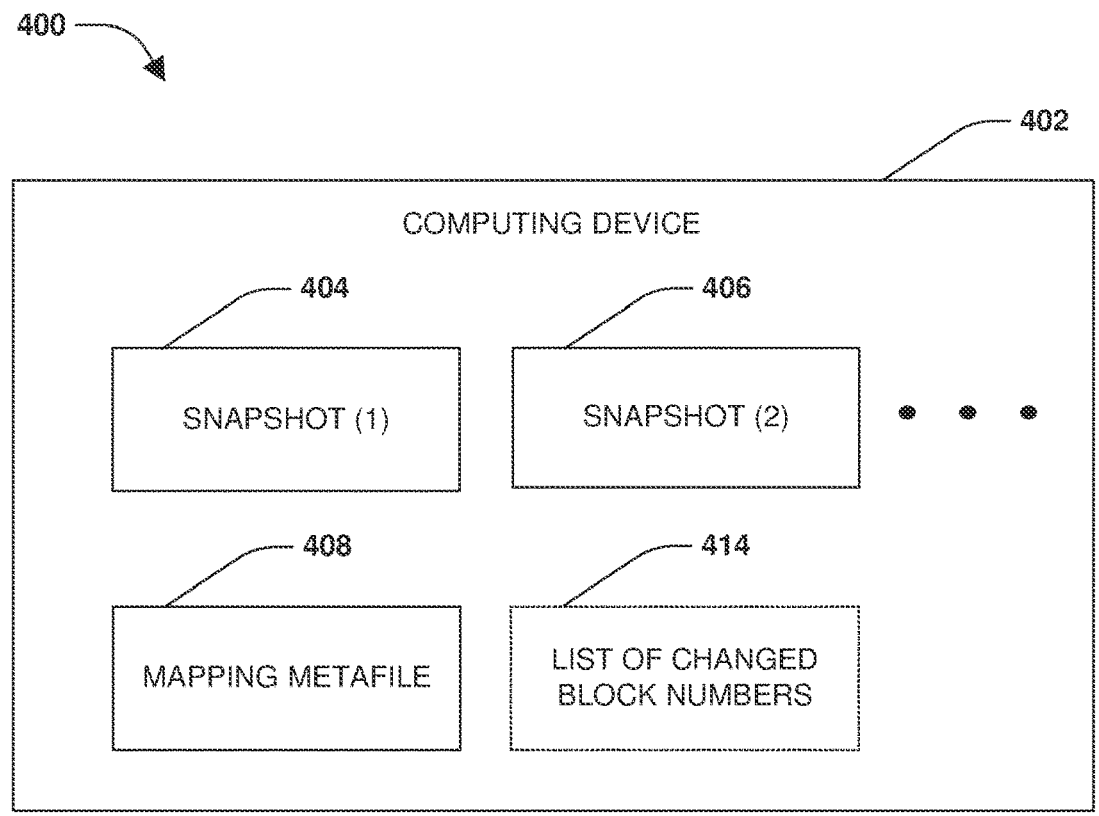
FIG. 4C is a component block diagram illustrating an example system for incremental snapshot copy to object store, where a list of changed block numbers are identified.
Figure 4C:
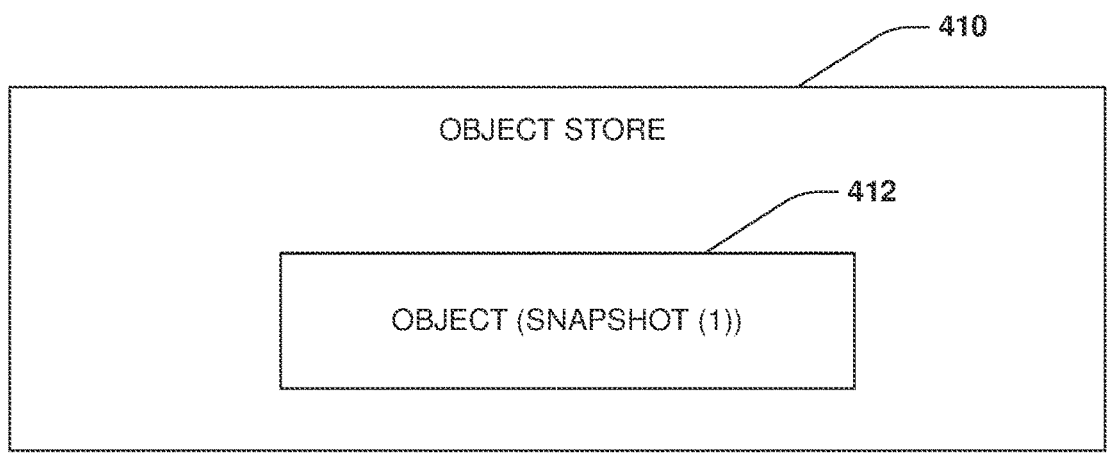

In an embodiment of the object format of objects stored within the object store, relatively larger objects will be stored in the object store. As will be described later, an embodiment of an object is illustrated by FIG. 4C. An object comprises an object header followed by data blocks (slots). The object header has a static array of slot context comprising information used to access data for slots. Each slot can represent any length of logical data (e.g., a slot is a base unit of data of the object file system of the object store). Since data blocks for metadata are normalized, a slot can represent any length of logical data. Data within the slots can be compressed into compression groups, and a slot will comprise enough information for how to decompress and return data of the slot.

In an embodiment, storage efficiency provided by the computing device is preserved within the object store. A volume copied from the computing device into objects of the object store is maintained in the object store as an independent logical representation of the volume. Any granularity of data can be represented, such as a directory, a qtree, a file, or other data container. A mapping metafile (a VMAP) is used to map virtual block IDs/names (e.g., a virtual volume block number, a hash, a compression group name, or any other set of names of a collection of data used by the computing device) to cloud block numbers in the object store. This mapping metafile can be used to track duplicate data per data container for storage efficiency.

The mapping metafile enables duplicate data detection of duplicate data, such as a duplicate block or a compression group (e.g., a compressed group of blocks/slots within an object). The mapping metafile is used to preserve sharing of data within and across multiple snapshots stored within objects in the object store. The mapping metafile is used for sharing of groups of data represented by a unique name. The mapping metafile is used to populate indirect blocks with corresponding cloud block numbers for children nodes (e.g., compressed or non-compressed). The mapping metafile is used to help a garbage collector make decisions on what cloud block numbers can be freed from the object store when a corresponding snapshot is deleted by the computing device. The mapping metafile is updated during a snapshot copy operation to store snapshot data from the computing device into objects within the object store. An overflow mapping metafile can also be used, such as to represent entries with base key collision. The overflow mapping metafile will support variable length key and payload in order to optimize a key size according to a type of entry in the overflow mapping metafile.

The mapping metafile may be indexed by virtual volume block numbers or starting virtual volume block numbers of a compression group. An entry within the mapping metafile may comprise a virtual volume block number as a key, a cloud block number, an indication of whether the cloud block number is the start of a compression group, a compression indicator, an indicator as to whether additional information is stored in the overflow mapping metafile, a logical length of the compression group, a physical length of the compression group, etc. Entries are removed/invalidated from the mapping metafile if corresponding virtual volume block numbers are freed by the computing device, such as when a snapshot is deleted by the computing device.

The data structure, such as the tree structure, is used to represent data within an object. Each node of the tree structure is represented by a cloud block number. The key to the tree structure may uniquely identify uncompressed virtual volume block numbers, a contiguous or non-contiguous compression group represented by virtual volume block numbers associated with such, and/or an entry for non-starting virtual volume block numbers of the compression group to a starting virtual volume block number of the compression group. A key will comprise a virtual volume block number, a physical length of a compression group, an indicator as to whether the entry represents a start of the compression group, and/or a variable length array of virtual volume block numbers of either non-starting virtual volume block numbers or the starting virtual volume block number (if uncompressed then this is field is not used). The payload will comprise cloud block numbers and/or flags corresponding to entries within the mapping metafile.

Before transferring objects to the object store for an incremental snapshot, the mapping metafile is processed to clear any stale entries. This is to ensure that a stale virtual volume block number or compression group name is not reused for sharing (deduplication). In particular, between two snapshots, all virtual volume block numbers transitioning from a 1 to 0 (to indicate that the virtual volume block numbers are no longer used) in a snapshot to be copied to the object store in one or more objects are identified. Entries within the mapping metafile for these virtual volume block numbers transitioning from a 1 to 0 are removed from the mapping metafile. In this way, all entries using these virtual volume block numbers are invalidated.

As part of copying a snapshot to the object store, changed data and indirections for accessing the changed data are transferred (or all data for initialization). In particular, changed user data of the computing device is traversed through buftrees using a snapdiff operation to determine a data difference between two snapshots. Logical (uncompressed) data is read and populated into objects and associated with cloud block numbers. To preserve storage efficiency, a mapping from a unique name representing the logical data (e.g., virtual volume block number or a compression group name for compressed data) to a cloud block number (e.g., of a slot within which the logical data is stored) is recorded in the mapping metafile. Lookups to the mapping metafile will be performed to ensure only a single copy of changed blocks are copied to the object store. Metadata is normalized for version independency and stored into objects. Indirects (non-leaf nodes) are stored in the object to refer to unchanged old cloud blocks and changed new cloud blocks are stored in the object, which provides a complete view of user data and metadata for each snapshot. Inodes are written to the object store while pushing changed inofile blocks to the object store. Each inode entry within an inofile is normalized to represent a version independent inode format. Each inode will have a list of next level of indirect blocks (e.g., non-leaf nodes of the tree structure storing indirects/pointers to other nodes). Snapinfo objects comprise snapshot specific information. A snapinfo object of a snapshot has a pointer to a root of a snapshot logical file system. A root object for each primary volume (e.g., a primary volume for which a snapshot is captured) is copied to the object store. Each snapshot is associated with an object ID (sequence number) map that tracks which objects are in use in a snapshot (e.g., which objects comprise data of the snapshot) and is subsequently used for garbage collection in the future when a particular snapshot is deleted.

In an embodiment of data access and restoration, the tree format represents an object file system (a cloud file system) that can be mounted and/or traversed from any remote device utilizing APIs using a thin layer orchestrating between client requests and object file system traversal. A remote device provides an entry point to the object tree using a universal identifier (UUID) that is a common identifier for all object names for a volume (or container). A rel root object is derived from the UUID, which has pointers (names) to next level snapinfo objects. If a user is browsing a snapshot, a snapshot snapinfo is looked up within snapinfo objects. If no snapshot is provided, then latest snapshot info is used. The snapshot info has cloud block numbers for an inode file. The inode file is read from the object store using the cloud block number and an inode within the inode file is read by traversing the inode file's tree structure. Each level including the inode has a cloud block number for a next level until a leaf node (a level 0 block of data) is read. Thus, the inode for the file of interest is obtained, and the file's tree structure is traversed by looking up cloud block number for a next level of the tree structure (e.g., a cloud block number from a level 1 is used to access the level 0 block) until the required data is read. Object headers and higher level indirects are cached to reduce the amount of access to the object store. Additionally, more data may be read from the object store than needed to benefit from locality for caching. Data access can be used to restore a complete copy of a snapshot, part of a snapshot (e.g., a single file or directory), or metadata.

In an embodiment of read/write cloning, a volume or file, backed from a snapshot in the object store, is created. Read access will use a data access path through a tree structure. At a high level, write access will read the required data from the object store (e.g., user data and all levels of the file/volume tree that are part of user data modification by a write operation). The blocks are modified and the modified content is rewritten to the object store.

In an embodiment, defragmentation is provided for objects comprising snapshot copies in the object store and to prevent fragmented objects from being sent to the object store during backup. Defragmentation of objects involves rewriting an object with only used data, which may exclude unused/freed data no longer used by the computing device (e.g., data of a deleted snapshot no longer referenced by other snapshots). An object can only be overwritten if used data is not changed. Object sequence numbers are not reused. Only unused data can be freed, but used data cannot be overwritten. Reads will ensure that slot header and data are read from same object (timestamp checking). Reading data from the object store involves reading the header info and then reading the actual data. If these two reads go to different objects (as determined by timestamp comparison), then the read operation is failed and retried.

Defragmentation occurs when snapshots are deleted and objects could not be freed because another snapshot still contains some reference to the objects that would be freed (not all slots within these objects are freed but some still comprise used data from other snapshots). A slot within an object can only be freed when all snapshots referring to that slot are deleted (e.g., an oldest snapshot having the object in use such that younger snapshots do not reuse the freed slots). Also, ownership count can be persistently stored. When a snapshot is deleted, all objects uniquely owned by that snapshot are freed, but objects present in other snapshots (e.g., a next/subsequent snapshot) are not freed. A count of such objects is stored with a next snapshot so that the next snapshot becomes the owner of those objects. Defragmentation is only performed when a number of used slots in an object (an object refcount) is less than a threshold. If the number is below a second threshold, then further defragmentation is not performed. In order to identify used slots and free slots, the file system in the snapshot is traversed and a bitmap is constructed where a bit will be used to denote if a cloud block is in use (a cloud block in-use bitmap). This map is used to calculate the object refcount.

To perform defragmentation, the cloud block in-use map is prepared by walking the cloud snapshot file system. This bitmap is walked to generate an object refcount for the object. The object refcount is checked to see if it is within a range to be defragmented. The object is checked to see if the object is owned by the snapshot by comparing an object ID map of a current and a previous snapshot. If the object is owned and is to be defragmented, then the cloud block in-use map is used to find free slots and to rewrite the object to comprise data from used slots and to exclude freed slots. The object header will be updated accordingly with new offsets.

Fragmentation may be mitigated. During backup, an object ID map is created to contain a bit for each object in use by the snapshot (e.g., objects storing snapshot data of the snapshot). The mapping metafile (VMAP) is walked to create the object ID map. An object reference map can be created to store a count of a number of cloud blocks in use in that object. If the count is below a threshold, then data of the used blocks can be rewritten in a new object.

For each primary volume copied to the object store, there is a root object having a name starting with a prefix followed by a destination end point name and UUID. The root object is written during a conclude phase. Another copy for the root object is maintained with a unique name as a defense to eventual consistency, and will have a generation number appended to the name. A relationship state metafile will be updated before the root object info is updated. The root object has a header, root info, and bookkeeping information. A snapshot info is an object containing snapshot specific information, and is written during a conclude phase of a backup operation. Each object will have its own unique sequence number, which is generated automatically.

To provide for managing objects within an object store using an object file system, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, In an embodiment a clustered network can be distributed over a plurality of storage systems and/or nodes located in a plurality of geographic locations; while In an embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In an embodiment, the host devices 108, 110 can exchange information with the network modules 120, 122 residing in the nodes 116, 118 (e.g., network hosts) in the data storage systems 102, 104.

In an embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that incremental snapshot copy to object store may be implemented within the clustered network environment 100, such as where nodes within the clustered network environment store data as objects within a remote object store. It may be appreciated that incremental snapshot copy to object store may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
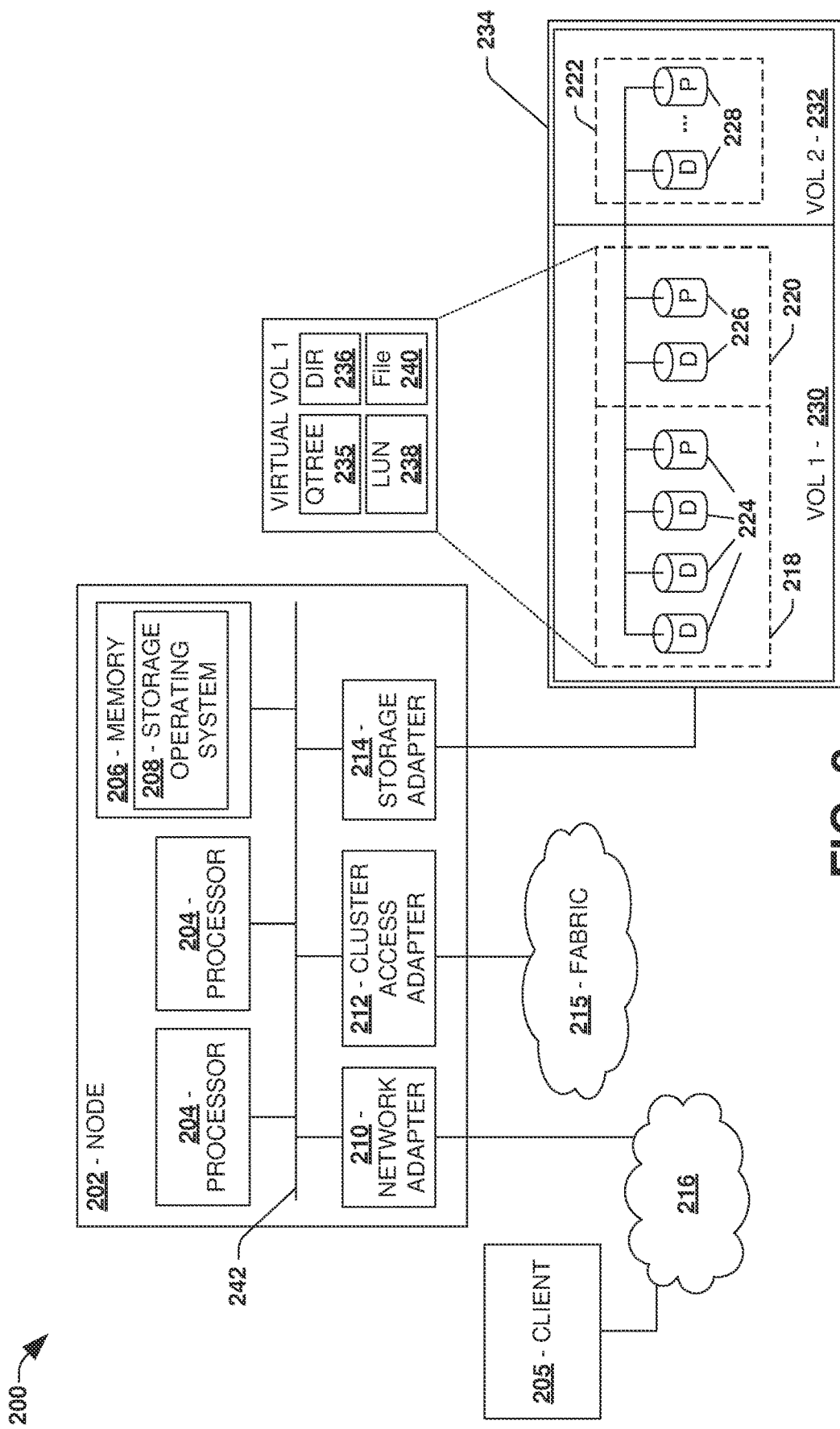
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In an embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that incremental snapshot copy to object store may be implemented for the data storage system 200. It may be appreciated that incremental snapshot copy to object store may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
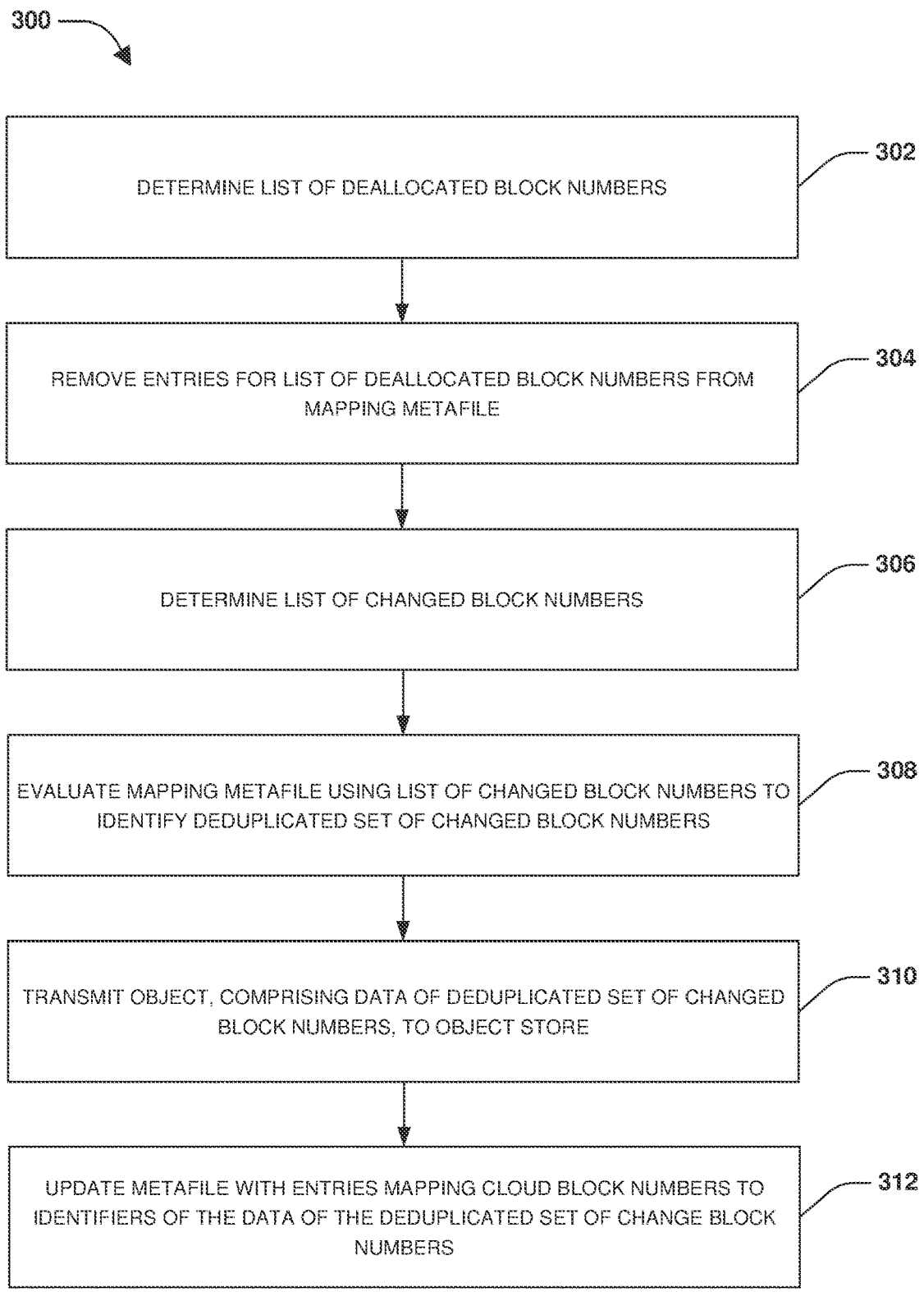
FIG. 3 is a flow chart illustrating an example method for incremental snapshot copy to object store.

One embodiment of incremental snapshot copy to object store is illustrated by an exemplary method 300 of FIG. 3 and further described in conjunction with system 400 of FIGS. 4A-4D. A computing device 402 may comprise a node, a storage controller, a storage service, an on-premises computing device, a storage virtual machine, or any other hardware or software (e.g., software as a service). The computing device 402 may store data within storage devices (primary storage) managed by the computing device 402. The computing device 402 may provide client devices with access to the data, such as by processing read and write operations from the client devices. The computing device 402 may create snapshots of the data, such as a snapshot of a file system of a volume accessible to the client devices through the computing device 402. For example, the computing device 402 may create a first snapshot 404 of the file system at a first point in time, a second snapshot 406 of the file system at a second point in time subsequent the first point in time, etc.

The computing device 402 may be configured to communicate with an object store 410 over a network. The object store 410 may comprise a cloud computing environment remote to the computing device 402, and is accessible to the computing device 402 over a network. The object store 410 may provide scalable cost effective storage for the computing device 402. Accordingly, the computing device 402 may incrementally copy snapshots of the primary storage of the computing device 402 into objects for storage in the object store 410 as copied snapshots. For example, data of the first snapshot 404 may be stored into slots a first object 412, and the first object 412 is then stored into the object store 410 as a first copied snapshot.

The computing device 402 is able to utilize an object file system and object format to store data into objects within the object store 410. For example, data, maintained by the computing device 402, is stored into a plurality of slots of an object. Each slot represents a base unit of data of the object file system defined for the object store 410. For example, the object comprises 1024 or any other number of slots, wherein each slot comprises 4 kb of data or any other amount of data. It may be appreciated that objects may comprise any number of slots of any size. Snapshot data, user data, directory blocks, metadata, and/or inofile blocks of an inofile comprising per inode metadata is stored into the slots of the object. In an example, snapshot data, of a snapshot created by the computing device 402 of the file system maintained by the computing device 402, is stored into the object (e.g., snapshot data of the first snapshot 404 is stored into the first object 412). For example, the object may be maintained as an independent logical representation of the snapshot, such that data of the snapshot is accessible through the object without having to reference other logical copies of other snapshots stored within objects of the object store 410, according to some embodiments. In an example, the data is converted from physical data into a version independent format for storage within the object.

In an example, the object is created to comprise data in a compressed state corresponding to compression of the data within the primary storage of the computing device 402. In this way, compression used by the computing device 402 to store the data is retained within the object for storage within the object store 410. The object may be assigned a unique sequence number. Each object within the object store 410 is assigned unique sequence numbers.

An object header may be created for the object. The object header comprises a slot context for slots within the object. The slot context may comprise information relating to a type of compression used for compressing data within the object (if any compression is used), a start offset of a slot, a logical data length, a compressed data length, etc. The slot context may be used to access compressed data stored within the object. The object header comprises various information, such as a version identifier, a header checksum, a length of the object, a slot context, and/or other information used to access and manage data populated into the slots of the object. The slot context comprises various information about the slots, such as a compression type of a slot (e.g., a type of compression used to compress data of slots into a compression group or an indicator that the slot does not comprise compressed data), a start offset of the slot within the object (e.g., a slot identifier multiplied by a slot size, such as 4 kb), a logical data length of the slot (e.g., 4 kb), a compressed length (e.g., 0 if uncompressed), an index of the slot within a compression group of multiple slots (e.g., 0 if uncompressed), a logical data checksum, etc.

A mapping metafile 408 (a VMAP) is maintained for the object. The mapping metafile 408 maps block numbers of primary storage of the computing device 402 (e.g., virtual volume block numbers of the data stored into slots of the object) to cloud block numbers of nodes of a tree structure representing portions of the data stored within the slots of the object. As will be described later, the objects within the object store 410 may be deduplicated with respect to one another (e.g., the object is deduplicated with respect to other objects using the mapping metafile 480 as part of being stored into the object store 410) and retain compression used by the computing device 402 for storing the snapshots within the primary storage.

In an embodiment, the mapping metafile 408 and/or an overflow mapping metafile are used to facilitate the copying of the snapshots to the object store 410 in a manner that preserves deduplication and compression, logically represents the snapshots as fully independent snapshots, and provides additional compression. In particular, the mapping metafile 408 is populated with entries for block numbers (e.g., virtual volume block numbers, physical volume block numbers, etc. used by the computing device 402 to reference data such as snapshot data stored by the computing device 402) of the snapshots maintained by the computing device 402 and copied into the objects of the object store 410 as copied snapshots. An entry within the mapping metafile 408 is populated with a mapping between a block number of data within a snapshot at the computing device 402 (e.g., a virtual volume block number) and a cloud block number (e.g., a cloud physical volume block number) of a slot within an object into which the data was copied when the snapshot was copied to the object store 410 as a copied snapshot. The entry within the mapping metafile 408 is populated with a compression indicator to indicate whether data of the block number is compressed or not (e.g., a bit set to a first value to indicate a compressed virtual volume block number and set to a second value to indicate a non-compressed virtual volume block number).

The entry within the mapping metafile 408 is populated with a compression group start indicator to indicate whether the block number is a starting block number for a compression group of a plurality of block numbers of compressed data blocks. The entry within the mapping metafile 408 may be populated with a logical length of an extent associated with the block number. The entry within the mapping metafile 408 may be populated with a physical length of the extent associated with the block number.

The entry within the mapping metafile 408 is populated with an overflow indicator to indicate whether the data block has an overflow entry within the overflow mapping metafile. The overflow mapping metafile may comprise a V+ tree, such as a special B+ tree with support for variable length key and payload so a key can be sized according to a type of entry being stored for optimization. The key uniquely represents all types of entries associated with a block number (a virtual volume block number). The key may comprise a block number field (e.g., the virtual volume block number of a data block represented by the block number or a starting virtual volume block number of a first data block of a compression group comprising the data block), a physical length of an extent of the data block, if the corresponding entry is a start of a compression group, and other block numbers of blocks within the compression group. The payload is a cloud block number (a cloud physical volume block number).

The mapping metafile 408 and/or the overflow mapping metafile may be indexed by block numbers of the primary storage (e.g., virtual volume block numbers of snapshots stored by the computing device 402 within the primary storage, which are copied to the object store 410 as copied snapshots). In an example, the block numbers may correspond to virtual volume block numbers of data of the snapshots stored by the computing device 402 within the primary storage. In an example, a block number corresponds to a starting virtual volume block number of an extent of a compression group.

The mapping metafile 408 and/or the overflow mapping metafile is maintained according to a first rule specifying that the mapping metafile 408 and/or the overflow mapping metafile represent a comprehensive set of cloud block numbers corresponding to a latest snapshot copied to the object store 410. The mapping metafile 408 and/or the overflow mapping metafile is maintained according to a second rule specifying that entries within the mapping metafile 408 and/or the overflow mapping metafile are invalidated based upon any block number in the entries being freed by the computing device 402.

A determination is made that a current snapshot, such as the second snapshot 406, is to be copied to the object store 410 as a copied second snapshot whose data is stored within a second object 418. The mapping metafile 408 and/or the overflow mapping metafile is used to determine what data of the current snapshot is to be copied to the object store 410 and what data already exists within the object store 410 so that only data not already within the object store 410 is transmitted to the object store 410 for storage within the second object 418.

Upon determining that the current snapshot is to be copied to the object store 410, an invalidation phase is performed. At 302, a list of deallocated block numbers 411 of primary storage of the computing device 402 (e.g., virtual volume block numbers, of the file system of which snapshots are created, that are no longer being actively used to store in-use data by the computing device 402) are determined, as illustrated by FIG. 4B. The list of deallocated block numbers 411 is determined based upon a difference between two snapshots of the primary storage (e.g., a difference between a base snapshot and an incremental snapshot of the file system), such as between the first snapshot 404 already copied to the object store 410 and the second snapshot 406 that is to be copied to the object store 410. As part of the invalidation phase, entries for the list of deallocated block numbers 411 are removed from the mapping metafile 408 and/or the overflow mapping metafile, at 304.

This invalidation phase is performed to remove entries within the mapping metafile 408 that are no longer valid due to the entries mapping data no longer referenced by the computing device 4102, such as by the current snapshot (e.g., the second snapshot 406). In particular, given a deallocated block's virtual volume block number, all entries within the mapping metafile 408 and/or the overflow mapping metafile are identified and removed.

Figure 4D:
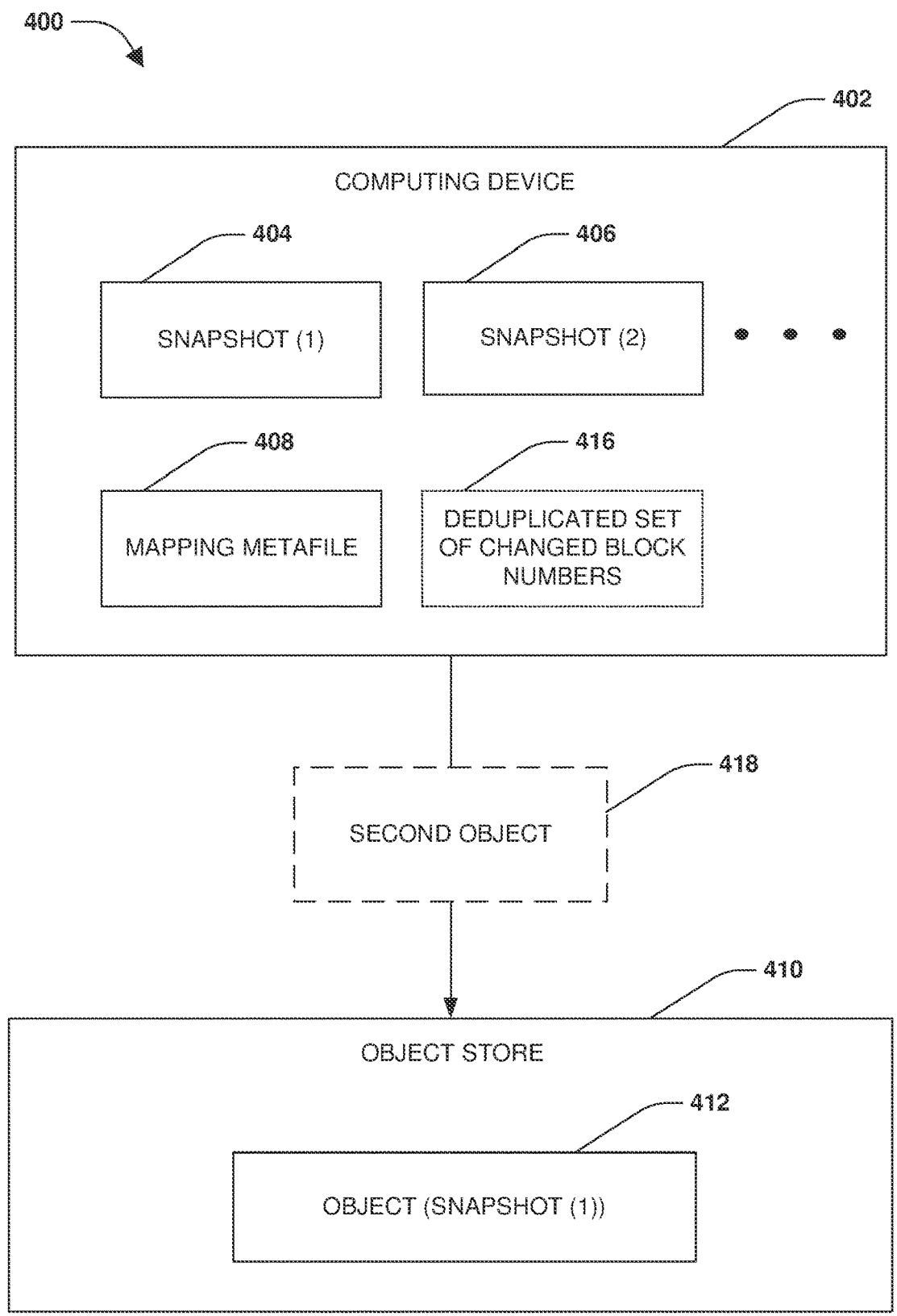
FIG. 4D is a component block diagram illustrating an example system for incremental snapshot copy to object store, where data of a deduplicated set of changed block numbers is created and store into an object store.

At 306, after the invalidation phase, a list of changed block numbers 414 corresponding to changes between the current snapshot of the primary storage being copied to the object store 410 and a prior copied snapshot already copied from the primary storage to the object store 410 is determined (e.g., a delta between the first snapshot 404 and the second snapshot 406), as illustrated by FIG. 4C. The mapping metafile 408 is evaluated using the list of changed block numbers 414 to identify a deduplicated set of changed block numbers 416 without entries within the mapping metafile 408, as illustrated by FIG. 4D. The deduplicated set of changed block numbers correspond to data, of the current snapshot (e.g., the second snapshot 406), not yet stored within the object store 410.

That is, the mapping metafile 408, after the invalidation phase, corresponds to data already stored within the object store 410 (e.g., the mapping metafile 408 maps block numbers of the primary storage to cloud block numbers of data currently stored within the object store 410). The list of changed block numbers 414 correspond to differences (e.g., delta data) between the first snapshot 404 and the second snapshot 406 (e.g., new data written to the file system after the first snapshot 404 was created, which existed in the file system when the second snapshot 406 of the file system was created). However, some of the delta data may already be stored within the object store 410. Thus, the list of changed block numbers 414 of the delta data are used to determine whether there are corresponding entries within the mapping metafile 408 mapping the changed block numbers to cloud block numbers of data already stored within the object store 410. If a changed block number is mapping within the mapping metafile 408 to a cloud block number, then the delta data of the changed block number is already within the object store 410 and thus the delta data is not included within the second object 418. Instead, merely a reference is used in place of the delta data. If a changed block number is not mapped within the mapping metafile 408 to any cloud block number, then delta data of the changed block number is included within the second object 418 because the delta data is not already stored within the object store 410. In this way, the deduplicate set of changed block numbers 416 of delta data not already stored within the object store 410 is identified.

The second object 418 is created to store data of the deduplicated set of changed block numbers 416 (e.g., data not already stored within the object store 410, and thus the second object 418 is deduplicated with respect to other data already stored within the object store 410 because merely references to the already stored data are used instead of duplicate copies of the data being stored within the second object 418). The second object 418 comprises a plurality of slots, such as 1024 or any other number of slots. The data of the deduplicated set of changed block numbers 416 is stored into the slots of the second object 418. An object header is updated with metadata describing the slots. In an example, the second object 418 is created to comprise the data in a compressed state corresponding to compression of the data in the primary storage. The second object 418 can be compressed by combining data within contiguous slots of the second object 418 into a single compression group. In this way, compression of the current snapshot (e.g., the second snapshot 406) maintained by the computing device 402 is preserved when the current snapshot is stored in the object store 410 as the second object 418 corresponding to a copy of the current snapshot.

The second object 418, comprising the data of the deduplicated set of changed block numbers 416, is transmitted to the object store 410 for storage as a new copied snapshot that is a copy of the current snapshot maintained by the computing device 402. The second object 418 is stored as a logical copy of the current snapshot. Also, additional compression may be applied to this logical data, and information used to uncompress the logical data is stored in the object header. Further, the second object 418 is maintained as an independent logical representation of the current snapshot, such that copied data, copied from the current snapshot, is accessible through the second object 418 without having to reference other logical copies of other copied snapshots stored in other objects within the object store 410, in some embodiments. Once the second object 418 is stored within the object store 410, the mapping metafile 408 and/or the overflow mapping metafile is updated with entries for the deduplicated set of changed block numbers 416 based upon receiving an acknowledgment of the second object 418 being stored by the object store 410, at 312. An entry will map a changed block number to a cloud block number of a slot within which data of the changed block number is stored in the second object 418.

Figure 5:
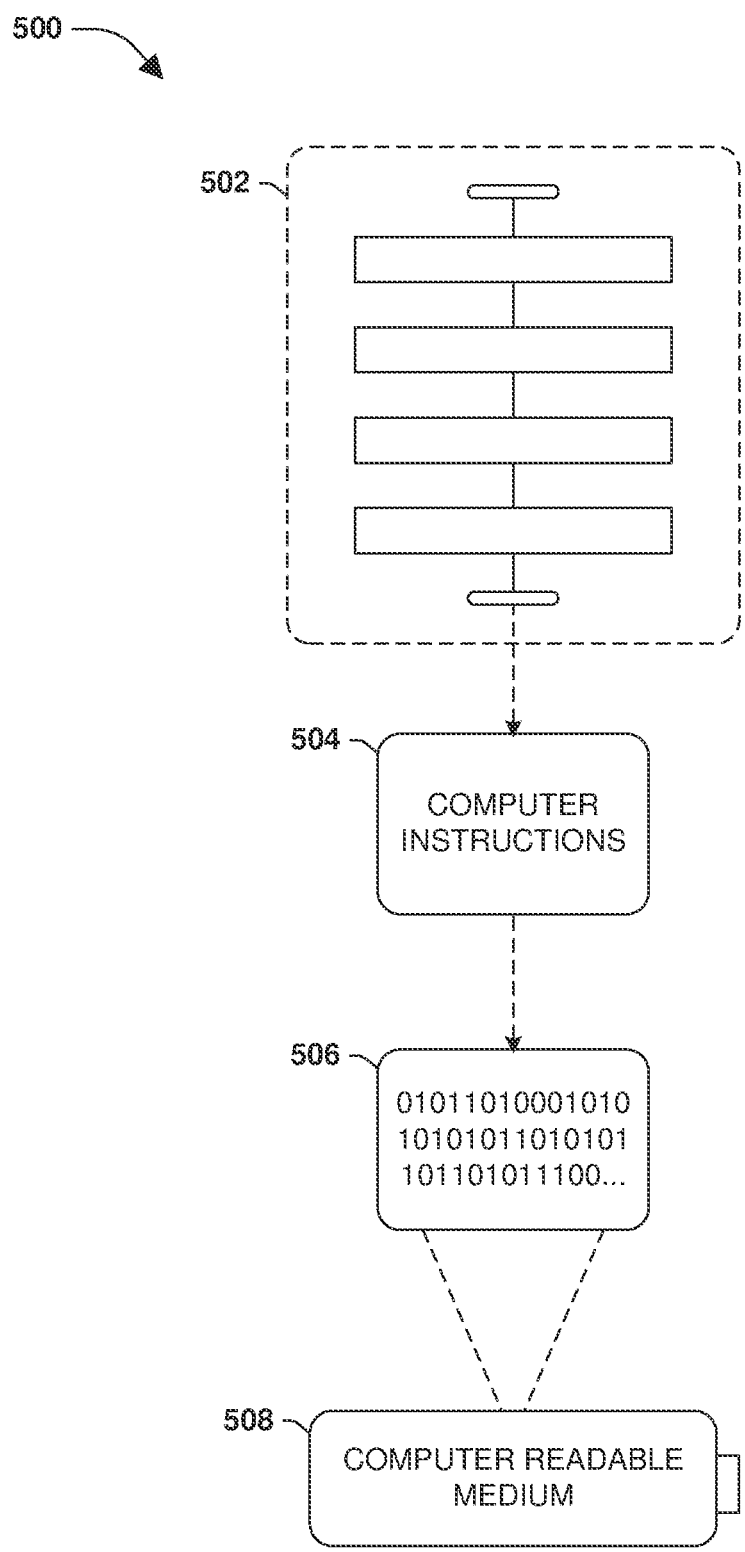
FIG. 5 is an example of a computer readable medium in which an embodiment of the invention may be implemented.

Still another embodiment involves a computer-readable medium 500 comprising processor-executable instructions configured to implement one or more of the techniques presented herein. An example embodiment of a computer-readable medium or a computer-readable device that is devised in these ways is illustrated in FIG. 5, wherein the implementation comprises a computer-readable medium 508, such as a compact disc-recordable (CD-R), a digital versatile disc-recordable (DVD-R), flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4B, for example. Many such computer-readable media are contemplated to operate in accordance with the techniques presented herein.

Figure 6:
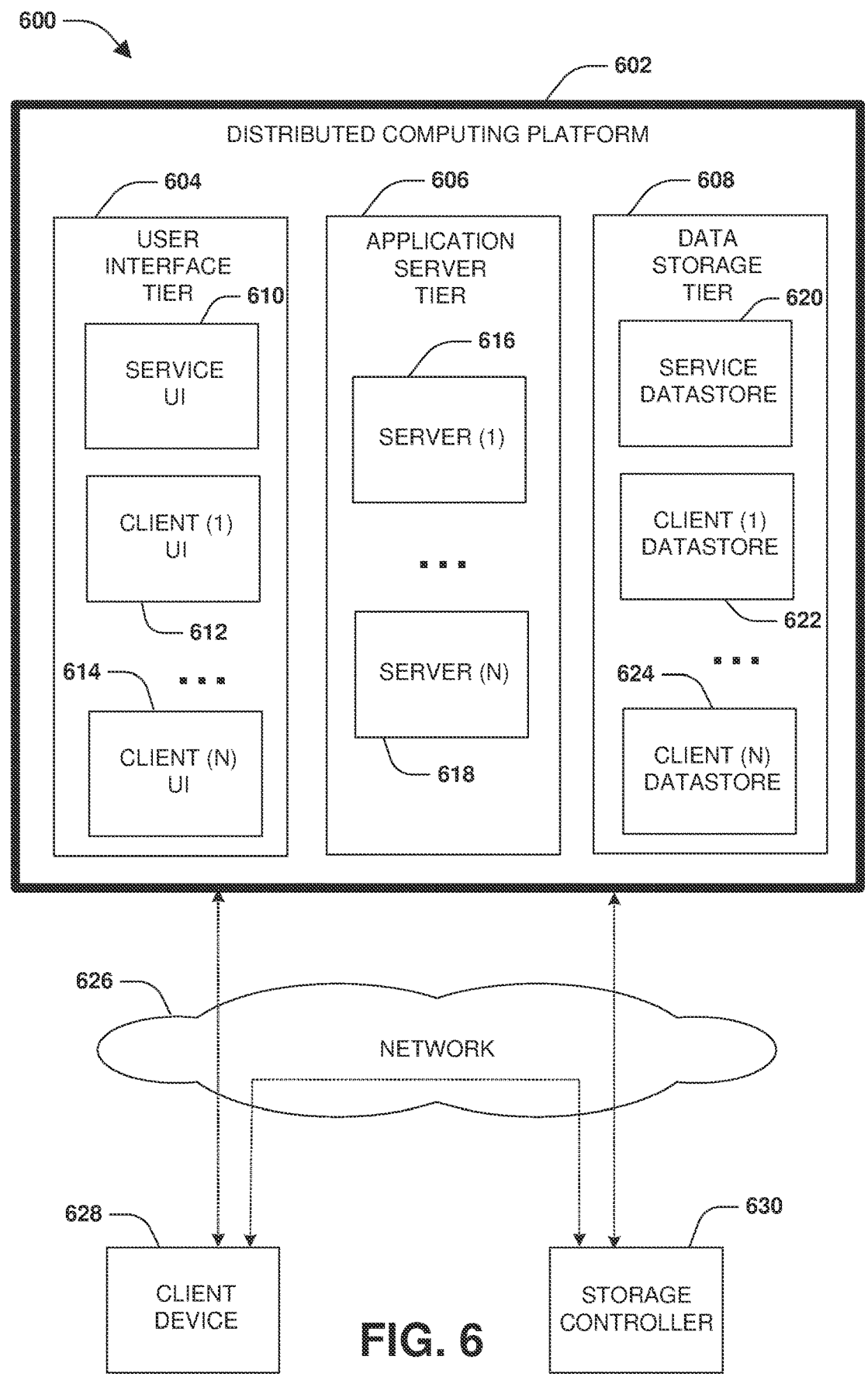
FIG. 6 is a component block diagram illustrating an example computing environment in which an embodiment of the invention may be implemented.

FIG. 6 is a diagram illustrating an example operating environment 600 in which an embodiment of the techniques described herein may be implemented. In one example, the techniques described herein may be implemented within a client device 628, such as a laptop, tablet, personal computer, mobile device, wearable device, etc. In another example, the techniques described herein may be implemented within a storage controller 630, such as a node configured to manage the storage and access to data on behalf of the client device 628 and/or other client devices. In another example, the techniques described herein may be implemented within a distributed computing platform 602 such as a cloud computing environment (e.g., a cloud storage environment, a multi-tenant platform, etc.) configured to manage the storage and access to data on behalf of the client device 628 and/or other client devices.

In yet another example, at least some of the techniques described herein are implemented across one or more of the client device 628, the storage controller 630, and the distributed computing platform 602. For example, the client device 628 may transmit operations, such as data operations to read data and write data and metadata operations (e.g., a create file operation, a rename directory operation, a resize operation, a set attribute operation, etc.), over a network 626 to the storage controller 630 for implementation by the storage controller 630 upon storage. The storage controller 630 may store data associated with the operations within volumes or other data objects/structures hosted within locally attached storage, remote storage hosted by other computing devices accessible over the network 626, storage provided by the distributed computing platform 602, etc. The storage controller 630 may replicate the data and/or the operations to other computing devices so that one or more replicas, such as a destination storage volume that is maintained as a replica of a source storage volume, are maintained. Such replicas can be used for disaster recovery and failover.

The storage controller 630 may store the data or a portion thereof within storage hosted by the distributed computing platform 602 by transmitting the data to the distributed computing platform 602. In one example, the storage controller 630 may locally store frequently accessed data within locally attached storage. Less frequently accessed data may be transmitted to the distributed computing platform 602 for storage within a data storage tier 608. The data storage tier 608 may store data within a service data store 620, and may store client specific data within client data stores assigned to such clients such as a client (1) data store 622 used to store data of a client (1) and a client (N) data store 624 used to store data of a client (N). The data stores may be physical storage devices or may be defined as logical storage, such as a virtual volume, LUNs, or other logical organizations of data that can be defined across one or more physical storage devices. In another example, the storage controller 630 transmits and stores all client data to the distributed computing platform 602. In yet another example, the client device 628 transmits and stores the data directly to the distributed computing platform 602 without the use of the storage controller 630.

The management of storage and access to data can be performed by one or more storage virtual machines (SMVs) or other storage applications that provide software as a service (SaaS) such as storage software services. In one example, an SVM may be hosted within the client device 628, within the storage controller 630, or within the distributed computing platform 602 such as by the application server tier 606. In another example, one or more SVMs may be hosted across one or more of the client device 628, the storage controller 630, and the distributed computing platform 602.

In one example of the distributed computing platform 602, one or more SVMs may be hosted by the application server tier 606. For example, a server (1) 616 is configured to host SVMs used to execute applications such as storage applications that manage the storage of data of the client (1) within the client (1) data store 622. Thus, an SVM executing on the server (1) 616 may receive data and/or operations from the client device 628 and/or the storage controller 630 over the network 626. The SVM executes a storage application to process the operations and/or store the data within the client (1) data store 622. The SVM may transmit a response back to the client device 628 and/or the storage controller 630 over the network 626, such as a success message or an error message. In this way, the application server tier 606 may host SVMs, services, and/or other storage applications using the server (1) 616, the server (N) 618, etc.

A user interface tier 604 of the distributed computing platform 602 may provide the client device 628 and/or the storage controller 630 with access to user interfaces associated with the storage and access of data and/or other services provided by the distributed computing platform 602. In an example, a service user interface 610 may be accessible from the distributed computing platform 602 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 612, a client (N) user interface 614, etc. The client (1) can access various services and resources subscribed to by the client (1) through the client (1) user interface 612, such as access to a web service, a development environment, a human resource application, a warehouse tracking application, and/or other services and resources provided by the application server tier 606, which may use data stored within the data storage tier 608.

The client device 628 and/or the storage controller 630 may subscribe to certain types and amounts of services and resources provided by the distributed computing platform 602. For example, the client device 628 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 630 can establish a subscription to have access to certain services and resources of the distributed computing platform 602.

As shown, a variety of clients, such as the client device 628 and the storage controller 630, incorporating and/or incorporated into a variety of computing devices may communicate with the distributed computing platform 602 through one or more networks, such as the network 626. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 602, such as a multi-tenant business data processing platform or cloud computing environment, may include multiple processing tiers, including the user interface tier 604, the application server tier 606, and a data storage tier 608. The user interface tier 604 may maintain multiple user interfaces, including graphical user interfaces and/or web-based interfaces. The user interfaces may include the service user interface 610 for a service to provide access to applications and data for a client (e.g., a "tenant") of the service, as well as one or more user interfaces that have been specialized/customized in accordance with user specific requirements, which may be accessed via one or more APIs.

The service user interface 610 may include components enabling a tenant to administer the tenant's participation in the functions and capabilities provided by the distributed computing platform 602, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 608 may include one or more data stores, which may include the service data store 620 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 602 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In an embodiment, the described methods and/or their equivalents may be implemented with computer executable instructions. Thus, In an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   generating an object comprising data of compressed block numbers;
   generating an indicator to indicate that the object comprises the data of the compressed block numbers;
   storing the object within an object store; and
   populating a mapping metafile with an entry for a block number of data stored within the object, wherein the entry maps the block number to a cloud block number associated with the object store, and wherein the entry is populated with a compression group start indicator to indicate whether the block number is a starting block number for a compression group of a plurality of block numbers of compressed data blocks in the compression group, and wherein the mapping metafile is maintained separate from the object.

2. The method of claim 1, wherein the compressed block numbers correspond to data blocks within primary storage, and the method comprising:
determining a list of deallocated block numbers of the primary storage; and
removing entries for the list of deallocated block numbers from the mapping metafile.

3. The method of claim 1, comprising:
populating the entry with a compression indicator to indicate whether data of the block number is compressed.

4. The method of claim 1, wherein the compressed block numbers correspond to data blocks within primary storage, and the method comprising:
determining a list of changed block numbers corresponding to changes between a current snapshot of the primary storage and a prior copied snapshot copied from the primary storage to the object store.

5. The method of claim 1, comprising:
populating the entry with an overflow indicator to indicate whether the data block has an overflow entry within an overflow mapping metafile.

6. The method of claim 1, comprising:
populating the entry with a logical length of an extent associated with the block number.

7. The method of claim 1, comprising:
populating the entry with a physical length of an extent associated with the block number.

8. The method of claim 1, wherein the compressed block numbers correspond to data blocks within primary storage that is hosted remote to the object store that is by a cloud computing environment.

9. The method of claim 1, wherein the compressed block numbers correspond to data blocks within primary storage, and the method comprising:
indexing the mapping metafile by the compressed block numbers of the primary storage, wherein a compressed block number corresponds to a virtual volume block number.

10. A non-transitory machine readable medium comprising instructions for performing a method, which when executed by a machine, causes the machine to:
generate an object comprising data of compressed block numbers of data stored within the object;
generate an indicator to indicate that the object comprises the data of the compressed block numbers;
store the object within an object store; and
populate a mapping metafile with an entry for a block number of data stored within the object, wherein the entry maps the block number to a cloud block number associated with the object store, and wherein the entry is populated with a compression group start indicator to indicate whether the block number is a starting block number for a compression group of a plurality of block numbers of compressed data blocks in the compression group, and wherein the mapping metafile is maintained separate from the object.

11. The non-transitory machine readable medium of claim 10, wherein the compressed block numbers correspond to data blocks within primary storage, and wherein the instructions cause the machine to:
determine a list of deallocated block numbers of the primary storage; and
remove entries for the list of deallocated block numbers from the mapping metafile.

12. The non-transitory machine readable medium of claim 10, wherein the instructions cause the machine to:
populate the entry with a compression indicator to indicate whether data of the block number is compressed.

13. The non-transitory machine readable medium of claim 10, wherein the compressed block numbers correspond to data blocks within primary storage, and wherein the instructions cause the machine to:
determine a list of changed block numbers corresponding to changes between a current snapshot of the primary storage and a prior copied snapshot copied from the primary storage to the object store.

14. The non-transitory machine readable medium of claim 10, wherein the instructions cause the machine to:
populate the entry with an overflow indicator to indicate whether the data block has an overflow entry within an overflow mapping metafile.

15. The non-transitory machine readable medium of claim 10, wherein the instructions cause the machine to:
populate the entry with a logical length of an extent associated with the block number.

16. The non-transitory machine readable medium of claim 10, wherein the instructions cause the machine to:
populate the entry with a physical length of an extent associated with the block number.

17. The non-transitory machine readable medium of claim 10, wherein the compressed block numbers correspond to data blocks within primary storage that is hosted remote to the object store that is by a cloud computing environment.

18. The non-transitory machine readable medium of claim 10, wherein the compressed block numbers correspond to data blocks within primary storage, and wherein the instructions cause the machine to:
index the mapping metafile by the compressed block numbers of the primary storage, wherein a compressed block number corresponds to a virtual volume block number.

19. A computing device, comprising:
a memory comprising machine executable code; and
a processor coupled to the memory, the processor configured to execute the machine executable code to cause the processor to:
generate an object comprising data of compressed block numbers of data stored within the object;
generate an indicator to indicate that the object comprises the data of the compressed block numbers;
store the object within an object store; and
populate a mapping metafile with an entry for a block number of data stored within the object, wherein the entry maps the block number to a cloud block number associated with the object store, and wherein the entry is populated with a compression group start indicator to indicate whether the block number is a starting block number for a compression group of a plurality of block numbers of compressed data blocks in the compression group, and wherein the mapping metafile is maintained separate from the object.

20. The computing device of claim 19, wherein the compressed block numbers correspond to data blocks within primary storage, and wherein the machine executable code causes the processor to:

determine a list of deallocated block numbers of the primary storage; and remove entries for the list of deallocated block numbers from the mapping metafile.

* * * * *